US012675170B2

(12) United States Patent
Tang et al.

(10) Patent No.: US 12,675,170 B2
(45) Date of Patent: Jul. 7, 2026

(54) METHOD FOR ISSUING AN INPUT TO A COMPUTER FROM A HEAD-MOUNTED DEVICE

(71) Applicant: Essilor International, Charenton le Pont (FR)

(72) Inventors: Daniel Tang, Charenton le Pont (FR); Paul Gil, Charenton le Pont (FR); Bruno Amir, Charenton le Pont (FR); Jean Sahler, Charenton le Pont (FR)

(73) Assignee: Essilor International, Charenton le Pont (FR)

( * ) Notice: Subject to any disclaimer, the term of this patent is extended or adjusted under 35 U.S.C. 154(b) by 0 days.

(21) Appl. No.: 18/622,070

(22) Filed: Mar. 29, 2024

(65) Prior Publication Data

US 2024/0329750 A1 Oct. 3, 2024

(30) Foreign Application Priority Data

Mar. 31, 2023 (EP) ..................................... 23305475

(51) Int. Cl.
G06F 3/01 (2006.01)
G06F 3/02 (2006.01)
(Continued)

(52) U.S. Cl.
CPC .............. G06F 3/017 (2013.01); G06F 3/012 (2013.01); G06F 3/02 (2013.01); G06F 3/0346 (2013.01); G06F 3/03543 (2013.01)

(58) Field of Classification Search
CPC . G06F 3/017; G06F 3/012; G06F 3/02; G06F 3/0346; G06F 3/03543;
(Continued)

(56) References Cited

U.S. PATENT DOCUMENTS 9,400,559 B2 * 7/2016 Latta ....................... G06F 3/017
9,442,631 B1 * 9/2016 Patel ....................... G06F 3/013
(Continued)

FOREIGN PATENT DOCUMENTS

WO WO 2023/009580 A2 2/2023
WO WO 2023/009580 A3 2/2023

OTHER PUBLICATIONS

Lik-Hang Lee, et al., "Interaction Methods for Smart Glasses: A Survey", IEEE Access, 2018, 21 Pages.

*Primary Examiner* — Grant Sitta
(74) *Attorney, Agent, or Firm* — Oblon, McClelland, Maier & Neustadt, L.L.P.

(57) ABSTRACT

The invention relates to a method for issuing an input to a computer from a head-mounted device, the head-mounted device comprising a processing unit and a memory as well as at least one position and/or movement sensor, the head-mounted device being in communication with the computer, the method being implemented while the head-mounted device is worn on a wearer's head.

The method comprises steps of:
- acquisition of position and/or movement data representative of the movement of the wearer's head by the position and/or movement sensor,
- detection of a specific movement pattern based on said position and/or movement data, the specific movement pattern being taken from a library of movement patterns,
- determination of a specific input associated with the specific movement pattern in the library, and
- issuance of the specific input to the computer.

10 Claims, 2 Drawing Sheets

(51) Int. Cl.
    *G06F 3/0346*      (2013.01)
    *G06F 3/0354*      (2013.01)

(58) Field of Classification Search
    CPC ...... G06F 1/163; G06F 1/1694; G06F 1/1698;
                G06F 3/011; G06F 3/013; G06F 3/03547;
                 G06F 3/04883; G02B 2027/0187; G02B
                 27/0093; G02B 27/017; G02B 2027/0178
    See application file for complete search history.

(56)               References Cited

U.S. PATENT DOCUMENTS

| | | | |
|---|---|---|---|
| 11,543,886 B2 * | 1/2023 | Richman | H04N 21/47 |
| 2009/0153366 A1 * | 6/2009 | Im | G06V 40/20 |
| | | | 341/20 |
| 2011/0317874 A1 * | 12/2011 | Ikenoue | G06F 3/017 |
| | | | 382/103 |
| 2015/0029088 A1 * | 1/2015 | Kim | G02B 27/017 |
| | | | 345/156 |
| 2017/0046881 A1 * | 2/2017 | Kuribara | G02B 27/017 |
| 2017/0060230 A1 * | 3/2017 | Faaborg | G06F 3/017 |
| 2018/0113590 A1 * | 4/2018 | Osterhout | G02B 27/0176 |
| 2018/0190039 A1 * | 7/2018 | Kuribara | G02B 27/017 |
| 2018/0364810 A1 * | 12/2018 | Parshionikar | G06F 3/013 |
| 2019/0053738 A1 * | 2/2019 | Zhang | A61B 5/1116 |
| 2020/0250284 A1 | 8/2020 | Diehl et al. | |
| 2020/0326847 A1 * | 10/2020 | Wang | G06F 3/0304 |
| 2021/0223864 A1 | 7/2021 | Forsland et al. | |
| 2022/0317462 A1 | 10/2022 | Kondo et al. | |
| 2024/0184378 A1 * | 6/2024 | Ghasemlou | G06F 3/017 |

* cited by examiner

METHOD FOR ISSUING AN INPUT TO A COMPUTER FROM A HEAD-MOUNTED DEVICE

FIELD OF THE INVENTION

The invention relates to the use of head-mounted electronic devices, notably smart glasses, in the context of computer applications.

More specifically, the invention relates to a method for issuing an input to a computer from a head-mounted device.

The invention also relates to a computer program for implementing this method, as well as a computer-readable storage medium containing such a computer program.

BACKGROUND OF THE INVENTION

The issuance of inputs to a computer is a universal task that usually revolves around the use of well-known devices such as a mouse and/or a keyboard and/or touch screens, for varied applications ranging from professional to recreational in nature.

However, complex inputs such as combinations of key presses, whether simultaneously or in rapid succession, remain somewhat impractical and require hand dexterity and speed. Furthermore, the use of a keyboard and mouse restrains the user in their position and movement relative to the computer, which is detrimental for example during meetings and presentations. This restriction of position may also lead to prolonged sitting and poor posture, and associated health problems.

Other types of inputs exist, for example vocal, but they are not always practical, especially in the presence of other people or surrounding noise.

Movement-based input methods include the use of a virtual reality headset, tracking movements of the wearer, but these systems are costly and bulky, including an integral screen and computer, and they are not compatible with existing methods. Furthermore, prolonged usage of these devices has sometimes proven unsatisfactory due to their weight and spatial disorientation.

Another method is the use of a track-hat, which is a head-mounted device bearing one or more reference lights, together with a camera and an image-treatment program to track the movements of the wearer's head and associate them with inputs. However, this type of input is limited to the window of the camera, restricting the movements of the wearer, and limiting the variety of distinguishable specific movement patterns.

There is thus a need of an input method allowing greater flexibility and comfort for the user and a larger number of registered movement patterns associated with a large variety of inputs.

SUMMARY OF THE INVENTION

To this end, the invention relates to a method for issuing an input to a computer from a head-mounted device, the head-mounted device comprising a processing unit and a memory as well as at least one position and/or movement sensor, the head-mounted device being in communication with the computer, the method being implemented while the head-mounted device is worn on a wearer's head, the method comprising steps of:

acquisition of movement related data representative of the movement of the wearer's head by the position and/or movement sensor, detection of a specific movement pattern based on said position and/or movement data, the specific movement pattern being taken from a library of movement patterns, determination of a specific input associated with the specific movement pattern in the library, and issuance of the specific input to the computer.

This method allows the wearer to use a different input method with a computer, that may be used on its own to free the hands of the wearer and allow them to stand up and move relative to the computer, or be used in conjunction with usual input devices such as a keyboard and/or a mouse, to allow for faster and/or more practical issuance of specific inputs, especially unpractical inputs such as complicated combination of keys.

The position and/or movement sensor may be a sensor configured to measure information relative to a position, a speed and/or an acceleration of the wearer's head.

Said speed and acceleration may be relative to movements in a straight line along at least one direction and/or for rotational movements along at least one axis. Similarly, said position may be a position in a cardinal reference base relative to a reference position and/or an angular position relative to a reference direction along at least one plane of measurement.

Said reference direction may be, for example, a direction pointing towards a magnetic North.

For example, the at least one position and/or movement sensor may comprise at least one accelerometer, at least one gyroscope and/or at least one magnetometer.

The head-mounted device may be in communication with the computer through a wireless communication protocol.

This feature allows for an increased mobility of the wearer relative to the computer.

Examples of such protocols are the "WiFi" protocol or the "Bluetooth Low Energy" protocol.

The library may be stored in the memory of the head-mounted device, the steps of detection, determination and issuance being implemented on the head-mounted device, by the processing unit.

This feature allows for a limited amount of calculation to be executed by the computer and reduces the amount of data transmitted from the head-mounted device to the computer.

Alternatively, the head-mounted device may transmit all the measured movement related data to the computer, the steps of detection and association being executed on the computer based on said transmitted data.

The input may comprise a combination of at least one keyboard key press.

The key presses may be simultaneous, such as for example Ctrl+C, and/or a succession of key presses with a predetermined time interval.

The input may comprise a combination of at least one mouse movement and/or at least one mouse key press.

Each mouse movement of the combination comprises for example a direction and an amplitude.

The mouse key presses may be simultaneous, such as for example left click+right click, and/or a succession of key presses with a predetermined time interval.

Other type of mouse interactions can also be included, such as for example a mouse wheel scroll.

Said interactions may be combined with movements and/or key presses, and may be simultaneous, such as for example mouse scroll+left click or mouse movement+right click, and/or a succession of interactions with a predetermined time interval in-between.

Other types of inputs may also be associated with head movements in the library.

For example, the library may associate a head movement with a pinching-movement type input in a trackpad or touchscreen, resulting in a zoom with two fingers.

Alternatively, the library may be set to associate the head movement to a joystick movement. For example, the library may directly associate a head inclination along a yaw, pitch or roll axis and/or acceleration movement to a corresponding joystick movement.

Alternatively, the input may comprise a predetermined command to an external device, for example a computer, computer device, smartphone, or connected home assistant. The input may for example replace a usual verbal command to said connected home assistant.

The at least one position and/or movement sensor may be an inertial motion unit comprising at least one accelerometer, at least one gyroscope and/or at least one magnetometer.

This feature allows to track movement of the wearer's head long six different coordinates, comprising three translation axes and three rotation axes, allowing for varied combinations of specific movement patterns.

The head-mounted device may be registered on the computer as a keyboard and/or mouse.

This feature simplifies the connection of the head-mounted device to the computer, any specific numerical treatment being executed on the head-mounted device with associated programs.

The specific movement pattern may comprise at least one head rotation movement along a yaw, pitch and/or roll axis, with a predetermined angular amplitude threshold.

The predetermined angular amplitude threshold may be compounded with a minimum duration of crossing said threshold for detecting the specific movement pattern.

The specific movement pattern may comprise at least one head translation movement along a frontal, lateral or vertical axis, with a predetermined length, speed, or acceleration threshold.

The specific movement pattern may comprise at least one finger tap on a frame of the head-mounted device.

The specific movement pattern may also comprise an eye movement complementing the head movement, the device comprising at least one eye-tracking camera for registering said eye movement. This allows to increase the number of combinations for specific movement patterns.

This eye movement may also be part of a triggering sequence announcing a specific movement pattern to be registered.

The specific movement pattern may comprise a modification of a resting position of a frame of the head-mounted device on the face of the wearer.

The specific movement pattern may comprise an orientation range for activation, for example to be enabled when the device is oriented facing a screen, with a predetermined angular range, and disabled when out of the screen direction.

These features allow for a wide variety of specific movement patterns to be register in the library, allowing for associating a large number of preregistered specific movement patterns with associated inputs.

The computer may be running a game program, the input being issued to the computer corresponding to an in-game action related to the specific movement pattern associated with the input in the library.

This feature allows the wearer to execute specific in-game action simultaneously or in rapid succession in a more practical manner by combining the method with usual input devices such as a regular keyboard and/or mouse. Furthermore, the correspondence between the specific movement pattern and the in-game action makes the association more natural to the user.

The invention also relates to a computer program which, when executed by a processing unit of a head mounted device comprising at least one position and/or movement sensor and in communication with a computer, enables the implementation of the previous method.

The invention further relates to a computer-readable storage medium comprising instructions for executing this computer program.

DETAILED DESCRIPTION OF EMBODIMENTS

A method for issuing an input to a computer 10 from a head-mounted device is described below.

Figure 1:
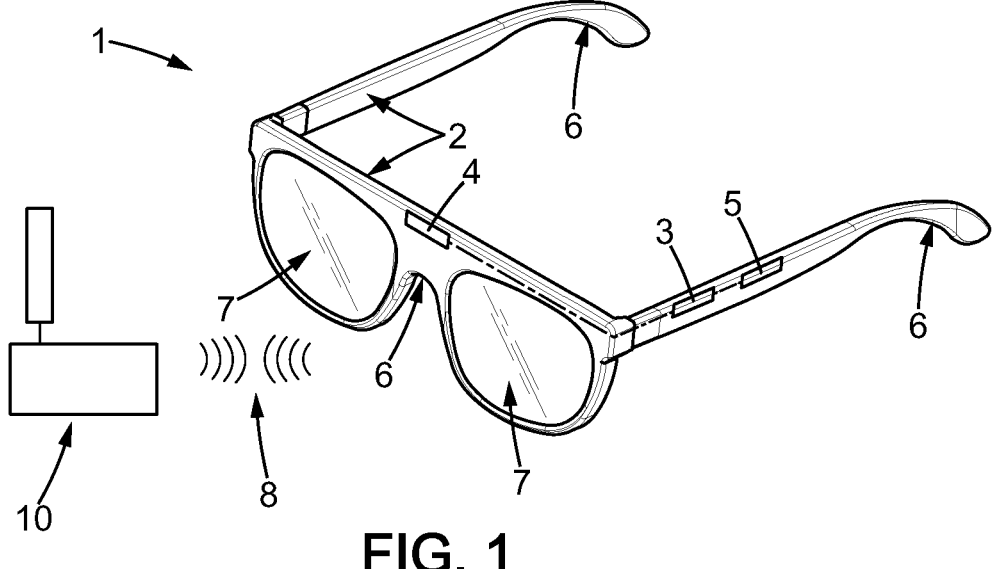
FIG. 1 is a schematic perspective view of a head-mounted device to be used for a method according to the invention.

In a first embodiment, a head-mounted device 1 for implementing this method is a set of smart glasses, as shown on FIG. 1.

It is known to integrate movement sensors, such as for example an inertial measurement unit (IMU) in the frame of electronic head mounted devices such as smart glasses, to track the position and movements of the wearer's head while the device is worn.

Integrating these position and movement sensors meets many types of application relative to the display of information, for example, or to the measurement of the behavior of an ophthalmic wearer.

Such a head-mounted device 1 typically comprises a rigid frame 2 comprising a single part or several articulated parts, comprising contact parts 6 arranged for being put on the face of a wearer by resting on at least one facial feature such as the nose and/or ears.

The head-mounted device 1 also comprises an electronic control module 3 and at least one sensor 4 for obtaining information representative of a position and of movement of the wearer's head.

The control module 3 comprises an electronic circuit comprising a processor for executing programs and a memory for storing information. The control module 3 is connected to each sensor 4 on the device 1 for piloting the sensor 4 and for analyzing and saving the obtained information.

The control module 3 further comprises at least one communication device, for example an antenna and/or a connection port, configured for communicating with an external computer though a wired or wireless link 8. The wireless link 8 may use a communication protocol such as WiFi or Bluetooth Low Energy, for example.

The head-mounted device 1 is advantageously registered on the computer 10 as a wireless keyboard and/or as a wireless mouse. Thus, inputs received from the head-mounted device 1 through the method according to the invention are treated by the computer 10 as inputs from such usual input devices and do not require a special interface software installed on the computer 10.

The head-mounted device 1 typically also comprises a battery 5 for providing electrical power to the control module 3 and to each sensor 4.

Each sensor 4 is able to measure information relative to movement or position of the wearer's head. Examples of such sensors 4 include inertial motion sensors (also known as IMU, for Inertial Motor Unit), which comprise an accelerometer to measure acceleration (i.e. acceleration along at least one axis) and a gyroscope, which measure angular velocities, and a magnetometer to measure the angles with a reference direction such as magnetic North pointing direction.

The sensor 4 may as well comprise any type of sensor that measures information that can be related to movement or position of the frame on the face of the wearer.

Figure 2:
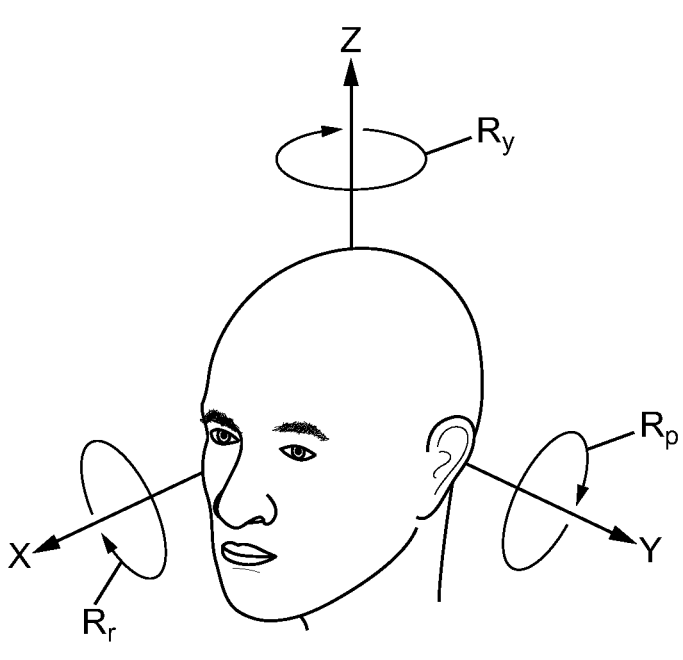
FIG. 2 is a schematic representation of movement directions and rotation axis, relative to a wearer's head.

Advantageously, as shown on FIG. 2, the information relative to the movement of the head may comprise data relative to a straight-line movement along a longitudinal axis X, a lateral axis Y and a vertical axis Z, as well as a roll rotation movement Rr, a pitch rotation movement Rp and a yaw rotation movement Ry, respectively around the longitudinal axis X, the lateral axis Y and the vertical axis Z.

This type of movement analysis allows a decomposition of the movement pattern across six independent variables to address a large variety of patterns.

The memory stores program information enabling the implementation of the steps of the method according to the invention by the processor of the control module 3, as well as a library associating predetermined head movement patterns with inputs, for implementing said method.

Each predetermined movement patterns registered in the library may comprise at least one head rotation component, along a yaw, pitch and/or roll axis, with a predetermined angular amplitude threshold.

The head rotation component may be instantaneous, thus being considered fully detected when the threshold is reached, or the predetermined angular amplitude threshold may be compounded with a minimum duration of crossing said threshold for detecting the specific movement pattern. Furthermore, rotational speed or acceleration may also be considered instead of or in combination with angular amplitude for the detection threshold.

Any rotational movement may be further considered with a hysteresis for deactivation of the movement detection. For example, if a movement pattern requires a yaw rotation of at least 10° to be held for 2 seconds, with a 5° hysteresis, the count for 2 seconds may start when the 10° threshold is crossed, but be stopped only when the rotation angle goes below 5° instead of 10°.

Each specific movement pattern may comprise at least one head translation movement along the frontal axis X, lateral axis Y or vertical axis Z, with a predetermined length, speed, or acceleration threshold. The crossing of said threshold along the preregistered components of the movement pattern causes a detection of the movement pattern.

Each specific movement pattern may also comprise at least one finger tap on a frame of the head-mounted device, and/or a modification of a resting position of a frame of the head-mounted device on the face of the wearer.

Each specific registered movement pattern may comprise a single one of the features above, or be a combination of several such features, accomplished simultaneously or in succession.

A straight-line movement may thus be combined with a rotational movement for detection of the associated movement pattern.

For example, a first specific movement pattern associated with a first input could be maintaining a rolling movement of the head along the longitudinal axis X of at least 15° for at least 2 seconds.

Another example of specific movement pattern could be a yaw rotation of at least 10° to the right around the vertical axis Z, followed by an inverse yaw rotation of at least 10° to the left around the vertical axis Z.

Yet another example of specific movement pattern could be a double tap on the frame within a one second delay.

A specific input is associated to each registered movement pattern in the library, to be issued when the associated movement pattern is detected.

The specific input may include any combination of one or move keyboard key press, mouse key press and/or mouse movement, simultaneously or in succession with preregistered time intervals.

Examples of such inputs include a single key press (keyboard, for example: press A, or mouse, for example right-click), a multiple key press (for example: press Ctrl and C simultaneously), a succession of multiple key presses (for example: press Ctrl and 3, then press R, then press G, then press ESC, with a 0.5 seconds interval between each successive press), or a continuous key press (for example: pressing F and not releasing the key while the movement pattern is held, or for a predetermined duration).

Other types of inputs may also be included in the library, associated with the virtual keyboard and/or virtual mouse role of the head-mounted device 1, for example a deactivation of the virtual keyboard when the device is moved from the face to the top of the head.

An advantageous implementation of this feature is, when the computer 10 is running a game program, the association in the library of an input to be issued to the computer with a specific movement pattern corresponding to an in-game action triggered by the input.

For example, a lateral head movement of the wearer could be associated with a key press triggering, in game, a similar lateral head movement or side lean of a player-controlled character. This type of association allows for a very fast and intuitive use of the method according to the invention in a gaming application.

The library of movement patterns and associated inputs may be setup on the memory through the communication device, by a computer running a specific dedicated software and/or a smartphone running a dedicated application.

This setup involves a selection by the user of specific inputs and designation of associated movement patterns and may involve a calibration of the device to obtain a desired sensitivity. The control module 3 is configured to analyze the information relative to movement or position of the wearer's head measured by the sensor 4 to identify specific predetermined movement patterns registered in the library, and to issue inputs through the communication device upon such identification.

The head-mounted device 1 may also comprise one or more optical elements 7, such as optical lenses, optical displays and/or filtering lenses, for example. The lenses may provide an optical correction or be piano lenses, depending on the needs of the wearer.

The lenses may also implement a filtration of the incident light on the wearer's eyes, for example for reducing an intensity of the light in the blue part of the color spectrum. This is particularly useful for prolonged exposure to computer screens to reduce discomfort.

Figure 3:
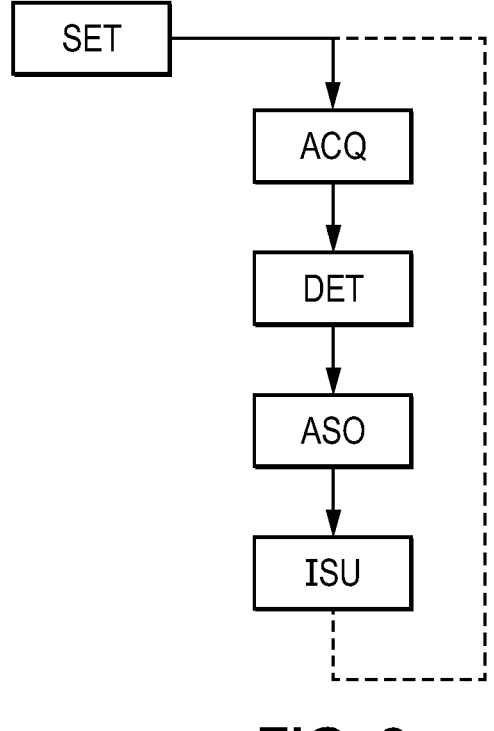
FIG. 3 is a schematic representation of the steps of the method according to the invention.

An embodiment of the method for issuing an input to a computer 10, implementing the head-mounted device 1 described above and connected to said computer 10, will be described in relation to FIG. 3, in view of all the features previously developed.

The method is implemented by the control module 3 executing instructions stored on the memory 5.

The method may comprise a preliminary setup phase SET, comprising the installation and/or modification of the library in the memory of the head-mounted-device 1, as well as the connection of the head-mounted device 1 to a running computer 10.

The setup phase SET may also include a standard calibration of the sensor 4, including an absolute calibration with the device 1 resting on a flat surface and/or a user-specific calibration with the device 1 worn with the head held in a standard resting position.

Advantageously, the setup phase SET comprises a substep of identifying the user from a database of registered users of the device stored in the memory, based on information obtained from the at least one sensors.

The information obtained from the at least one sensor for identifying the user may be relative to at least one biomarker allowing identification of the user when compared to reference values stored in the database and associated with the registered users.

The biomarker may be an iris print, wherein an image of at least one iris of the user is taken by a camera and compared to a reference image from the library by the control module.

The biomarker may be a number of fiducial points from a heart activity monitoring, compared to stored heart activity monitoring sequences from the memory.

After the substep of identifying the user, the setup phase SET may comprise a substep of loading a set of preregistered calibration parameters specific of the identified user for use of the head-mounted device.

The installation or modification of the library may be implemented through the computer 10 running a specific program, or through a connected smartphone running a specific application, for example.

The method comprises an acquisition step ACQ, comprising the continuous acquisition of position and/or movement data representative of the movement of the wearer's head by the position and/or movement sensor 4.

The method then comprises a detection step DET, which comprises the detection of a specific movement pattern based on said position and/or movement data, the specific movement pattern being taken from the library of movement patterns.

As developed above, the identification of the preregistered movement pattern is based on movement features along at least one straight line movement component and/or at least one rotational movement components, as saved in the library.

The method then comprises an association step ASO, which comprises the determination of a specific input associated with the specific movement pattern in the library.

The method further comprises an issuance step ISU, comprising the issuance of the determined input to the computer 10 through the communication device.

The method continuously restarts at the acquisition step ACQ after issuance of each input, until termination of the method by using a specific input or by turning off the head-mounted device 1.

In another embodiment of the invention, the determination step DET and the association step ASO are implemented directly on the computer 10 connected to the head-mounted device 1. In this case, the complete movement and/or position data obtained through the sensors 4 is transmitted to the computer 10 through the connection device, and the analysis is run on the computer by a specific program running thereon. The input is then issued by the software running on the computer 10 directly to the computer itself.

This allows a shift of the processing load from the control module 3 installed on the head-mounted device 1 to the processing unit of the computer 10, which is likely more powerful, but requires a larger data flow between the device 1 and the computer and requires the preliminary installation on the computer 10 of a specific software, instead of a simple keyboard and/or mouse detection by the computer 10.

The invention claimed is:

1. A method for issuing an input to a computer from a head-mounted device, the head-mounted device comprising a processing unit and a memory as well as at least one position and/or movement sensor, the head-mounted device being in communication with the computer, the method being implemented while the head-mounted device is worn on a wearer's head, the method comprising steps of:

acquisition of position and/or movement data representative of the movement of the wearer's head by the position and/or movement sensor, detection of a specific movement pattern based on said position and/or movement data, the specific movement pattern being taken from a library of movement patterns, determination of a specific input associated with the specific movement pattern in the library, and issuance of the specific input to the computer, wherein the specific input acts as a predetermined combination of multiple keyboard key presses without the wearer actually performing the key presses on the keyboard, wherein the specific movement pattern comprises at least one head rotation movement along a yaw, pitch and/or roll axis, with a predetermined angular amplitude threshold, wherein the predetermined angular amplitude threshold is compounded with a minimum duration of crossing said threshold for detecting the specific movement pattern, and wherein the specific movement pattern comprises at least one finger tap on a frame of the head-mounted device.

2. The method according to claim 1, wherein the head-mounted device is in communication with the computer through a wireless communication protocol.

3. The method according to claim 1, wherein the library is stored in the memory of the head-mounted device, the steps of detection, determination and issuance being implemented on the head-mounted device, by the processing unit.

4. The method according to claim 1, wherein the at least one position and/or movement sensor is an inertial motion unit comprising at least one accelerometer, at least one gyroscope and/or at least one magnetometer.

5. The method according to claim 1, wherein the head-mounted device is registered on the computer as a keyboard and/or mouse.

6. The method according to claim 1, wherein the library of movement patterns further comprises at least one head translation movement along a frontal, lateral or vertical axis, with a predetermined length, speed, or acceleration threshold.

7. The method according to claim 1, wherein the library of movement patterns further comprises a modification of a resting position of a frame of the head-mounted device on the face of the wearer.

8. The method according to claim 1, wherein the computer is running a game program, the input being issued to the computer corresponding to an in-game action related to the specific movement pattern associated with the input in the library.

9. A non-transitory computer-readable storage medium comprising a computer program which, when executed by a processing unit of a head mounted device comprising at least one position and/or movement sensor and in communication with a computer, enables the implementation of the method according to claim 1.

10. The method according to claim 1, wherein the specific input acts as a predetermined combination of at least one mouse movement and/or at least one mouse key press without the wearer actually operating the mouse.

\*   \*   \*   \*   \*